(12) United States Patent
Vu et al.

(10) Patent No.: US 11,535,519 B2
(45) Date of Patent: Dec. 27, 2022

(54) METHOD FOR THE MANUFACTURE OF PRISTINE GRAPHENE FROM KISH GRAPHITE

(71) Applicant: ArcelorMittal, Luxembourg (LU)

(72) Inventors: Thi Tan Vu, Oviedo (ES); Oscar Perez Vidal, Oviedo Asturias (ES); Roberto Suarez Sanchez, Aviles Asturias (ES)

(73) Assignee: ArcelorMittal, Luxembourg (LU)

( * ) Notice: Subject to any disclaimer, the term of this patent is extended or adjusted under 35 U.S.C. 154(b) by 51 days.

(21) Appl. No.: 17/051,162

(22) PCT Filed: Apr. 5, 2019

(86) PCT No.: PCT/IB2019/052803
§ 371 (c)(1),
(2) Date: Oct. 27, 2020

(87) PCT Pub. No.: WO2019/220226
PCT Pub. Date: Nov. 21, 2019

(65) Prior Publication Data
US 2021/0230000 A1   Jul. 29, 2021

(30) Foreign Application Priority Data

May 16, 2018   (WO) .................. PCT/IB2018/053413

(51) Int. Cl.
*C01B 32/196*   (2017.01)
*C01B 32/19*   (2017.01)
*C01B 32/182*   (2017.01)

(52) U.S. Cl.
CPC ............ *C01B 32/19* (2017.08); *C01B 32/182* (2017.08); *C01B 32/196* (2017.08);
(Continued)

(58) Field of Classification Search
CPC ..... C01B 32/182; C01B 32/19; C01B 32/196; C01B 2204/02; C01B 2204/04; C01B 2204/30; C01B 2204/32
See application file for complete search history.

(56) References Cited

U.S. PATENT DOCUMENTS

| | | |
|---|---|---|
| 4,075,114 A | 2/1978 | Ishikawa |
| 5,330,680 A | 7/1994 | Sakawaki et al. |

(Continued)

FOREIGN PATENT DOCUMENTS

| | | | |
|---|---|---|---|
| CN | 102431998 A | * | 5/2012 |
| CN | 103879990 A | | 6/2014 |

(Continued)

OTHER PUBLICATIONS

Munuera, J. M., et al. "High quality, low oxygen content and biocompatible graphene nanosheets obtained by anodic exfoliation of different graphite types." Carbon 94 (2015): 729-739.*

(Continued)

*Primary Examiner* — Richard M Rump
(74) *Attorney, Agent, or Firm* — Davidson, Davidson & Kappel, LLC

(57) ABSTRACT

A method for the manufacture of pristine graphite from Kish graphite including three different steps A, B and C; the pristine obtained with among others a high amount of carbon atoms, i.e. a pristine graphene having a high purity; and the use of this pristine graphene.

16 Claims, 1 Drawing Sheet

(52) U.S. Cl.
CPC ...... *C01B 2204/02* (2013.01); *C01B 2204/04* (2013.01); *C01B 2204/30* (2013.01); *C01B 2204/32* (2013.01)

(56) References Cited

U.S. PATENT DOCUMENTS

| | | |
|---|---|---|
| 2011/0280787 A1 | 11/2011 | Chen et al. |
| 2014/0154164 A1 | 6/2014 | Chen et al. |
| 2014/0248214 A1 | 9/2014 | Hersam et al. |
| 2016/0228846 A1 | 8/2016 | Chen et al. |
| 2016/0236939 A1 | 8/2016 | De Miguel et al. |
| 2016/0347619 A1 | 12/2016 | Chang et al. |
| 2018/0072573 A1 | 3/2018 | Chaki et al. |

FOREIGN PATENT DOCUMENTS

| | | |
|---|---|---|
| CN | 105948033 A | 9/2016 |
| CN | 107673338 | 2/2018 |
| CN | 104059618 B | 4/2018 |
| JP | S49112898 A | 10/1974 |
| JP | S51109914 A | 9/1976 |
| JP | S5344917 B2 | 12/1978 |
| JP | S6369705 A | 3/1988 |
| JP | H02153810 A | 6/1990 |
| JP | H0647315 A | 2/1994 |
| JP | H1017313 A | 1/1998 |
| JP | 2012131691 A | 7/2012 |
| JP | 2012515705 A | 7/2012 |
| JP | 2013212975 A | 10/2013 |
| JP | 2016190781 A | 11/2016 |
| JP | 2016534958 A | 11/2016 |
| KR | 101109961 B1 | 2/2020 |
| WO | WO2017027731 A1 | 2/2017 |
| WO | WO2018/178842 | 10/2018 |
| WO | WO2018178845 A1 | 10/2018 |
| WO | WO2019/220227 A1 | 11/2019 |
| WO | WO2019/220228 A1 | 11/2019 |
| WO | WO2019/224619 A1 | 11/2019 |
| WO | WO2019/224620 A1 | 11/2019 |

OTHER PUBLICATIONS

Zhang, Ming, et al. "Production of graphene sheets by direct dispersion with aromatic healing agents." Small 6.10 (2010): 1100-1107.*
L. Stobinski et al., "Graphene oxide and reduced graphene oxide studied by the XRD, TEM and electron spectroscopy methods", Journal of Electron Spectroscopy and Related Phenomena., NL, (Aug. 1, 2014), vol. 195, ISSN 0368-2048, pp. 145-154.
Morimoto et al.: "Tailoring the oxygen content of graphite and reduced graphene oxide for specific applications", Scientific Reports, vol. 6, No. 1, Feb. 25, 2016.
Jinguao Song et al.: "Preparation and Characterization of Graphene Oxide", Journal of nanomaterials, vol. 2014, Jan. 1, 2014, pp. 1-6.
International Search Report of PCT/IB2019/052803, dated Jul. 27, 2019.
Jung-Chui An et al, "Preparation of Kish graphite-based graphene nanoplatelets by GIC (graphite intercalation compound) via process", Journal of Industrial and Engineering Chemistry, Korea, (Jun. 1, 2015), vol. 26, ISSN 1226-086X, pp. 55-60.
Z-S Wu et al, "Synthesis of high-quality graphene with a predetermined number of layers", Carbon,, (Nov. 5, 2008), vol. 47, pp. 493-499.
Javad Rafiee: "Wetting transparency of graphene", Nature Materials, Mar. 1, 2012 Nature Publishing Group UK, London, vol. 11, Nr: 3, pp. 217-222.
Ranjbarzadeh Ramin et al:"Empirical analysis of heat transfer and friction factor of water/graphene oxide nanofluid flow in turbulent regime through an isothermal pipe"; Applied Thermal Engineering, Jul. 27, 2017 Pergamon, Oxford, GB vol. 126, pp. 538-547.
Park et al.:"Effects of nanofluids containing graphene/graphene-oxide nanosheets on critical heat flux"; Applied Physics Letters, Jul. 12, 2010 American Institute of Physics, 2 Huntington Quadrangle, Melville, NY 11747; vol. 97, Nr: 2, pp. 23103.
Morimoto: "Tailoring the Oxygen Content of Graphite and Reduced Graphene Oxide for Specific Applications"; Scientific Reports, Apr. 1, 2016; vol. 6, Nr: 1.

* cited by examiner

METHOD FOR THE MANUFACTURE OF PRISTINE GRAPHENE FROM KISH GRAPHITE

The present invention relates to a method for pristine graphene from Kish graphite. In particular, pristine graphene will have applications in metal industries including steel, aluminum, stainless steel, copper, iron, copper alloys, titanium, cobalt, metal composite, nickel industries, for example as coating or as a cooling reagent.

BACKGROUND

Kish graphite is a byproduct generated in the steelmaking process, especially during the blast furnace process or iron making process. Indeed, Kish graphite is usually produced on the free surface of molten iron during its cooling. It comes from molten iron at 1300-1500° C., which is cooled at a cooling rate between 0.40° C./min and 25° C./h when transported in the torpedo car or at higher cooling rates during the ladle transfer. An extensive tonnage of Kish graphite is produced annually in a steel plant.

Since Kish graphite comprises a high amount of carbon, usually above 50% by weight, it is a good candidate to produce graphene based materials. Usually, Graphene based materials include: graphene, graphene oxide, reduced graphene oxide or nanographite.

Graphene is a single layer of Graphite consisting of carbon atoms that are bonded together in a hexagonal honeycomb lattice. In other terms, it is an allotrope of carbon in the structure of a plane of $sp^2$ bonded atoms.

There are various techniques to manufacture Graphene such as Mechanical Liquid Exfoliation and Chemical process. Obtaining a good quality of Graphene is very difficult whatever the technique used.

For example, in the Liquid Exfoliation process, the graphene is directly obtained by mechanical exfoliation of graphite. However, the graphene obtained has some defects such as small area graphene flakes, colloidal stability and low yield. Additionally, the Graphene obtained will not be completely in one plane. Finally, the yield of graphene is very low, i.e. up to 5-10%.

Chemical processes include Chemical Vapor Deposition (CVD) and the Hummer Method.

The Hummer Method comprises the following steps:
the creation of a mixture of Kish graphite, sodium nitrate and sulfuric acid,
the addition of potassium permanganate as oxidizing agent to oxidize graphite into graphite oxide,
the mechanical exfoliation of graphite oxide into monolayer or a few layers of graphene oxide and
the reduction of graphene oxide into reduced graphene oxide.

The patent KR101109961 discloses a method of manufacturing graphene, comprising:
a step of pretreating Kish graphite,
a step of manufacturing graphite oxide by oxidizing the pretreated Kish graphite with an acid solution;
a step of manufacturing graphene oxide by exfoliating the graphite oxide and
a step of manufacturing reduced graphene oxide by reducing the graphene oxide with a reducing agent.

However, it is difficult to obtain graphene comprising among others an insignificant amount of oxygen groups. A lot of defects are present in the obtained graphene.

When the graphene is obtained by CVD method, it includes many defects such as foreign atoms sitting in place of carbon.

The publication called "Preparation of Kish Graphite-based graphene nanoplatelets by GIC (graphite intercalation compound) via process", Journal of Industrial and Engineering Chemistry, vol. 26, 1 Jun. 2015, pages 55-60, discloses a method for the preparation of the graphene nanoplatelets wherein purified kish graphite flake is added to sulfuric acid to prepare acid-based GIC. Then, Kish GIC is expanded using commercial grade microwave oven (LG, MW231GBM, power=800 W). Finally, acquired expanded graphite is added in isopropyl alcohol and pulverized with ultrasonic wave generator to be exfoliated into the multi-layered graphene platelets.

Nevertheless, pristine graphene is not obtained using this method. Only multi-layered graphene platelets are obtained. Additionally, sulfuric acid is used during the intercalation. However, the intercalation is very long since it is performed overnight. Finally, by using microwave, it is difficult to control the expansion degree.

Thus, there is a need to produce graphene with an insignificant number of defects, commonly called the Pristine graphene. Pristine graphene means Graphene is in its original condition, i.e. ideal, and does not have any defect, i.e. comprising at least 90% of carbons atoms, all located in the same plan in a single layer.

SUMMARY OF THE INVENTION

It is an object of the present invention to provide an easy to implement method for the manufacture of pristine graphene having an insignificant number of defects from kish graphite. In particular, the object is to provide an environmentally friendly method to obtain pristine graphene with a high purity.

The present invention provides a method for the manufacture of pristine graphene from kish graphite comprising A. the provision of kish graphite, B. optionally, a pre-treatment of kish graphite, C. a synthesis step of pristine graphene from the kish-graphite comprising the following successive sub-steps: i. the intercalation of kish graphite with a nitrate salt and an acid to obtain intercalated kish graphite, ii. the thermal expansion of the intercalated kish graphite to obtain expanded kish graphite at a temperature above 600° C., iii. the exfoliation by ultra-sonication to obtain exfoliated kish graphite, iv. the separation of the unexfoliated kish graphite and the obtained pristine graphene.

The invention also covers pristine graphene manufactured according to the method being one single layer of carbon atoms bonded together in a honeycomb lattice comprising less than 5% of oxygens groups, less than 5% of nitrogen groups and less than 0.5% of hydrogen atoms.

The following terms are defined:
A flotation step means a process for selectively hydrophobic material, such as kish graphite or pristine graphene, from hydrophilic materials.

Other characteristics and advantages of the invention will become apparent from the following detailed description of the invention.

BRIEF DESCRIPTION OF THE DRAWING

To illustrate the invention, various embodiments and trials of non-limiting examples will be described, particularly with reference to the following Figures.

DETAILED DESCRIPTION

The present invention relates to a method for the manufacture of pristine graphene from kish graphite comprising:
A. The provision of kish graphite,
B. Optionally, a pre-treatment of kish graphite,
C. A synthesis step of pristine graphene from the kish graphite comprising the following successive sub-steps:
  i. the intercalation of kish graphite with a nitrate salt and an acid to obtain intercalated kish graphite,
  ii. the thermal expansion of the intercalated kish graphite to obtain expanded kish graphite at a temperature above 600° C.,
  iii. the exfoliation by ultra-sonication to obtain exfoliated kish graphite and
  iv. the separation of the unexfoliated kish graphite and the pristine graphene.

Without willing to be bound by any theory, it seems that with the method according to the present invention, the purity of pristine graphene is highly improved especially with the intercalation step C.i) that modifies the structure of Kish graphite, the thermal expansion step C.ii) and the ultra-sonication step C.iii).

Usually, graphite consists of carbon layers with a gap between two carbon layers around 0.34 nm. In this case, it is very difficult to separate 2 layers of carbon due to the low gap leading to a very low yield of the exfoliation process, i.e. up to 5-10%.

Figure 1:
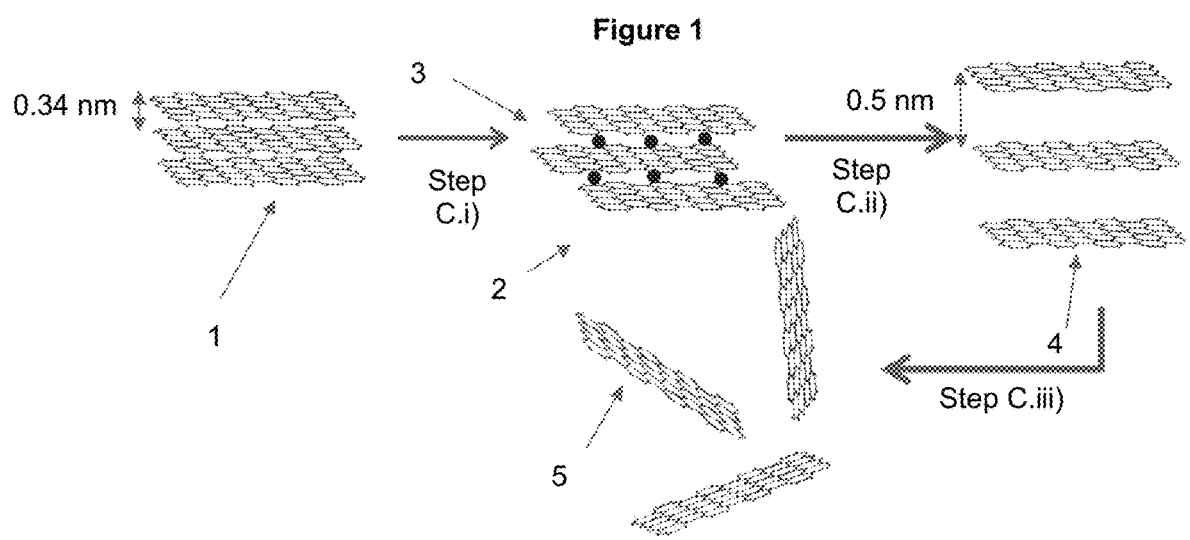
FIG. 1 illustrates the synthesis of pristine graphene from kish graphite with the method according to the present invention.

According to the present invention, as illustrated in FIG. 1, kish graphite 1 comprises of carbon layers with a gap between two carbon layers around 0.34 nm. It is believed that by performing an intercalation step C.i) using a nitrate salt and an acid, a small part of the acid reacts with the nitrate to produce nitric acid. Indeed, the mixture of two acids including nitric acid as such is too dangerous to manage at industrial scale. On the contrary, the method according to the present invention is safe. Thus, to obtain intercalated kish graphite 2, the obtained nitric acid and the rest of the acid 3 are introduced into the kish graphite layers to form among others graphite-nitrate. The functional groups introduced between two carbon layers without oxidizing the graphite include oxygen, nitrogen and/or hydrogen functional groups. Then, it seems that during the thermal expansion step C.ii) to obtain expanded kish graphite 4, the introduced groups are decomposed into gaseous compounds so that the gap between two layers increases to around 0.5 nm. After, the gaseous compounds are automatically removed. Then, the exfoliation by ultra-sonication C.iii) is easily performed leading to a pristine graphene 5 with a minimum of defects.

Preferably, in step A), the Kish graphite is a residue of the steelmaking process. For example, it can be found in a blast furnace plant, in an iron making plant, in the torpedo car and during ladle transfer.

Preferably, in step B), the pre-treatment of kish-graphite comprises the following successive sub-steps:
i. A sieving step wherein the kish graphite is classified by size as follows:
  a) Kish graphite having a size below 50 μm,
  b) Kish graphite having a size above or equal to 50 μm, the fraction a) of kish graphite having a size below 50 μm being removed,
ii. a flotation step with the fraction b) of kish graphite having a size above or equal to 50 μm,
iii. an acid leaching step wherein an acid is added so that the ratio in weight (acid amount)/(kish graphite amount) is between 0.25 and 1.0,
iv. optionally, the kish graphite is washed and dried.

Without willing to be bound by any theory, it seems that when the kish graphite is pre-treated with the method according to the present invention, it allows for the production of pristine graphene having improved quality since the pre-treated Kish graphite has a high purity. Indeed, the Kish graphite obtained after step B) has a purity of at least 90%. Moreover, the pre-treatment step B) is easy to implement at industrial scale and is more environmentally friendly than conventional methods.

In step B.i), the sieving step can be performed with a sieving machine.

After the sieving, the fraction a) of Kish graphite having a size below 50 μm is removed. Indeed, without willing to bound by any theory, it is believed that the kish graphite having a size below 50 μm contains a very small quantity of graphite, for example less than 10%.

Preferably in step B.ii), the flotation step is performed with a flotation reagent in an aqueous solution. For example, the flotation reagent is a frother selected from among: methyl isobutyl carbinol (MIBC), pine oil, polyglycols, xylenol, S-benzyl-S'-n-butyl trithiocarbonate, S,S'-dimethyl trithiocarbonate and S-ethyl-S'-methyl trithiocarbonate. Advantageously, the flotation step is performed using a flotation device.

Preferably, in step B.i), the fraction a) of kish graphite having a size below 55 μm is removed and in step B.ii), the fraction b) of kish graphite has a size above or equal to 55 μm. More preferably, in step B.i), the fraction a) of kish graphite having a size below 60 μm is removed and wherein in step B.ii), the fraction b) of kish graphite has a size above or equal to 60 μm.

Preferably, in steps B.i) and B.ii), the fraction b) of kish graphite has a size below or equal to 300 μm, any fraction of kish graphite having a size above 300 μm being removed before step B.ii).

More preferably in steps B.i) and B.ii), the fraction b) of kish graphite has a size below or equal to 275 μm, any fraction of kish graphite having a size above 275 μm being removed before step B.ii).

Advantageously, in steps B.i) and B.ii), the fraction b) of kish graphite has a size below or equal to 250 μm, any fraction of kish graphite having a size above 250 μm being removed before step B.ii).

In step B.iii), the (acid amount)/(kish graphite amount) ratio in weight is between 0.25 and 1.0, advantageously between 0.25 and 0.9, more preferably between 0.25 and 0.8. For example, the (acid amount)/(kish graphite amount) ratio in weight is between 0.4 and 1.0, between 0.4 and 0.9 or between 0.4 and 1. Indeed, without willing to be bound by any theory, it seems that if the (acid amount)/(kish graphite amount) ratio is below the range of the present invention, there is a risk that the kish graphite comprises a lot of impurities. Moreover, it is believed that if the (acid amount)/(kish graphite amount) ratio is above the range of the present invention, there is a risk that a huge amount of chemical waste is generated.

Preferably, in step B.iii), the acid is selected among the following elements: chloride acid, phosphoric acid, sulfuric acid, nitric acid or a mixture thereof.

The pre-treated Kish graphite obtained after step B) of the method according to the present invention has a size above or equal to 50 µm. The pre-treated Kish graphite has a high purity, i.e. at least of 90%. Moreover, the degree of crystallinity is improved compared to conventional methods allowing higher thermal and electrical conductivities and therefore higher quality.

In step C.i), the intercalation of kish graphite is performed with a nitrate salt and an acid to obtain intercalated kish graphite. It is believed that the intercalation is more efficient and faster by using a nitrate salt and an acid compared to the use of an acid alone.

For example, in step C.i), the kish graphite is mixed with a nitrate salt and an acid at room temperature. The mixture can be magnetically or mechanically agitated to obtain homogenous intercalation of the nitrate salt and the acid between the carbon layers of the kish graphite.

Advantageously, in step C.ii), the acid is chosen from: $H_2SO_4$, HCl, $HNO_3$, $H_3PO_4$, $C_2H_2Cl_2O_2$ (dichloroacetic acid), $HSO2OH$ (alkylsulfonic acid) or a mixture thereof.

Preferably, in step C.ii), the nitrate salt is chosen from: $NaNO_3$, $NH_4NO_3$, $KNO_3$, $Ni(NO_3)_2$, $Cu(NO_3)_2$, $Zn(NO_3)_2$, $Al(NO_3)_3$ or a mixture thereof.

For example, when $H_2SO_4$ is used with the nitrate salt. It seems that a part of $H_2SO_4$ reacts with the nitrate salt to produce nitric acid ($HNO_3$) as follows:

$$NaNO_3 + H_2SO_4 \rightarrow HNO_3 + Na_2SO_4,$$

$$NH_4NO_3 + H_2SO_4 \rightarrow HNO_3 + (NH_4)_2SO_4,$$

$$KNO_3 + H_2SO_4 \rightarrow HNO_3 + K_2SO_4,$$

$$Ni(NO_3)_2 + H_2SO_4 \rightarrow 2HNO_3 + NiSO_4,$$

$$Zn(NO_3)_2 + H_2SO_4 \rightarrow 2\ HNO_3 + ZnSO_4,$$

$$Cu(NO_3)_2 + H_2SO_4 \rightarrow 2HNO_3 + CuSO_4 \text{ and}$$

$$2Al(NO_3)_3 + 3H_2SO_4 \rightarrow 6HNO_3 + Al_2(SO_4)_3.$$

Then, it is believed that $HNO_3$ and $H_2SO_4$ are introduced between the kish graphite layers forming at least graphite-nitrate and graphite bisulfate. It seems that $HNO_3$ has fuming properties that can be significantly reduced due to the presence of $H_2SO_4$ and $Na_2SO_4$.

In step C.ii), the expansion is preferably performed by thermally treated the intercaled kish graphite at a temperature above 900° C., more preferably between 900 and 1500° C. and advantageously between 900 and 1200° C. in air or in inert gas. Indeed, without willing to be bound by any theory, it is believed that the heating temperature can play an important role in the synthesis of pristine graphene. The inventors have found that the removal of the intercalated functional groups from kish graphite is very efficient at this temperature because, due to the extremely high heating rate, there is a sudden expansion of the decomposition of the introduced acid and nitrate in gaseous products. This sudden expansion leads to a highest gap between graphite layers. Thus, it seems that the exfoliation is performed more easily resulting in a high yield of pristine graphene.

Preferably, in step C.ii), the thermal expansion does not include microwave expansion, i.e. expansion is not performed by using microwave oven. Indeed, it is believed that the degree of expansion degree of graphite cannot be control using a microwave oven. Moreover, there is a risk to obtain a heterogenous expansion.

Preferably, in step C.ii), the expansion is performed during 1 min to 2 hours and preferably between 15 min and 60 min.

Preferably, in step C.iii), before the mechanical exfoliation, the expanded kish graphite obtained in step Cii) is mixed with vitamin B2 called Riboflavin. For example, the mixture is dispersed into water.

Advantageously, the ultra-sonication is performed during a time at least 1 hour, advantageously between 1 h15 and 5 hours, preferably, between 1 h15 and 3 hours. Indeed, without willing to be bound by any theory it is believed that when the ultra-sonication is performed during the above time, the expanded kish graphite layers are better exfoliated resulting in a high yield of pristine graphene. Since high temperature can be reach during the exfoliation, it is possible to cool down the mixture using for example an ice-bath.

Then, preferably, in step C.iv), the separation of the unexfoliated kish graphite and the obtained pristine graphene is performed by centrifugation, decantation, distillation or flotation. Preferably, it is performed by centrifugation.

After the separation, optionally, a washing is performed for example with water. Preferably, distilled water is used.

Then, optionally, a drying step is performed by several techniques such as freezing powder or vacuumed drying the pristine graphene to obtain pristine graphene.

By applying the method according to the present invention, Pristine Graphene being one single layer of carbon atoms bonded together in a honeycomb lattice comprising less than 5% of oxygens groups, less than 5% of nitrogen groups and less than 0.5% of hydrogen atoms is obtained.

Preferably, pristine graphene being one single layer of carbon atoms bonded together in a honeycomb lattice comprising less than 3% of oxygens groups, less than 5% of nitrogen groups and less than 0.5% of hydrogen atoms is obtained. More preferably, pristine graphene being one single layer of carbon atoms bonded together in a honeycomb lattice comprising less than 2% of oxygens groups, less than 5% of nitrogen groups and less than 0.5% of hydrogen atoms is obtained.

Figure 2:
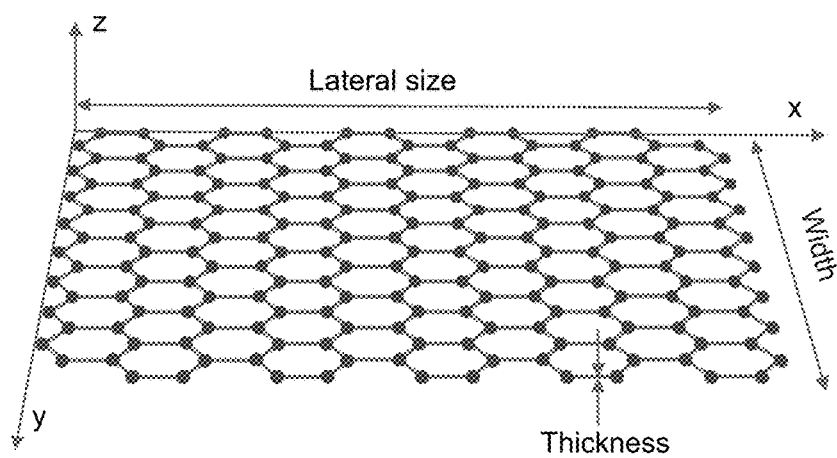
FIG. 2 illustrates an example of pristine graphene according to the present invention.

FIG. 2 illustrates an example of the pristine graphene according to the present invention. The lateral size means the highest length of the layer through the X axis, the thickness means the height of the layer through the Z axis and the width is illustrated through the Y axis.

Preferably, the lateral size of the pristine graphene is below 40 µm, preferably below 30 µm and advantageously, between 1 to 30 µm.

Preferably, pristine graphene is deposited on metallic substrate steel to improve some properties such as corrosion resistance of a metallic substrate.

In another preferred embodiment, pristine graphene is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid be used to cool down a metallic substrate.

For example, the metallic substrate is selected from among: aluminum, stainless steel, copper, iron, copper alloys, titanium, cobalt, metal composite, nickel.

The invention will now be explained in trials carried out for information only. They are not limiting.

Examples

All Trials were prepared by providing Kish graphite from steelmaking plant. Then, Kish graphite was sieved to be classified by size as follows:
a) Kish graphite having a size below <63 µm and
b) Kish graphite having a size above or equal to 63 µm.

The fraction a) of Kish graphite having a size below 63 µm was removed.

For all Trials, a flotation step with the fraction b) of Kish graphite having a size above or equal to 63 µm was performed. The flotation step was performed with a Humboldt Wedag flotation machine with MIBC as a frother. The following conditions were applied:
Cell volume (l): 2,
Rotor speed (rpm): 2000,
Solid concentration (%): 5-10,
Frother, type: MIBC,
Frother, addition (g/T): 40,
Conditioning time (s): 10 and
Water conditions: natural pH, room-temperature.

Trials 1 to 6 were then leached with the hydrochloric acid in aqueous solution. Trials were then washed with deionized water and dried in air at 90° C. A pre-treatment kish graphite was obtained with a yield of 95%.

After, the pretreated kish graphite was mixed with sodium nitrate and sulfuric acid. The mixture was magnetically agitated. The mixture was then washed with distilled water and dried in an oven at 90° C. Intercaled kish graphite was obtained.

Then, the intercaled kish graphite was thermally treated at temperature between 600 and 1000° C. during 1 hour. The intercaled kish graphite was cooled down to room temperature. Expanded kish graphite was obtained.

Then, the expanded kish graphite was mixed with vitamin B2 and then the mixture was dispersed into deionized water. The dispersion was then sonicated using an ice-bath. The sonication was performed during 1 to 2 h30 min. Exfoliated kish graphite was obtained.

Finally, Trials were centrifuged, washed and dried. Pristine graphene was obtained. Pristine graphene was characterized by combustion, pyrolysis and scanning electron microscopy (SEM). Results are shown in the following Table 1:

| Trials | Expansion temperature in step C.ii (° C.) | Sonication time in step C.iii | Lateral size (µm) | Carbon, nitrogen, hydrogen (%) C | O | N | H | Pristine yield (%) with respect to kish graphite |
|---|---|---|---|---|---|---|---|---|
| 1* | 600 | 1 hour | Around 20 µm | 94 | 1 | 3 | 0 | 27 |
| 2* | 800 | 1 hour | Around 20 µm | 95 | 2 | 3 | 0 | 22 |
| 3* | 1000 | 1 hour | Around 20 µm | 94 | 2 | 3 | 0 | 37 |
| 4* | 1000 | 1 h 30 min | Around 20 µm | 92 | 1 | 3 | 0 | 77 |
| 5* | 1000 | 2 hours | Around 20 µm | 94 | 1 | 4 | 0 | 78 |
| 6* | 1000 | 2 h 30 min | Around 20 µm | 94 | 2 | 4 | 0 | 85 |

*according to the present invention

The purity of pristine graphene of all Trials was high since the carbon percentage was above 90% compared to the conventional methods, i.e. up to 5-10%. The pristine graphene obtained comprises an insignificant amount of oxygen, nitrogen and no hydrogen. Additionally, for Trials 4, 5 and 6, the yield of pristine graphene was significantly improved.

What is claimed is:

1. A method for the manufacture of pristine graphene from kish graphite comprising:
    A. providing kish graphite,
    B. pre-treating the kish graphite, said pre-treatment of kish-graphite including the following successive sub-steps:
        i. a sieving step wherein the kish graphite is classified by size as follows:
            a) kish graphite having a size below 50 µm,
            b) kish graphite having a size above or equal to 50 µm,
            the fraction a) of the kish graphite having the size below 50 µm being removed,
        ii. a flotation step with the fraction b) of the kish graphite having the size above or equal to 50 µm,
        iii. an acid leaching step wherein an acid is added so that a ratio in weight (acid amount)/(the kish graphite amount) is between 0.25 and 1.0,
        iv. optionally washing and drying the kish graphite
    C. synthesizing pristine graphene from the kish-graphite including the following successive sub-steps:
        i. intercalating the kish graphite with a nitrate salt and an acid to obtain intercalated kish graphite,
        ii. thermal expanding the intercalated kish graphite to obtain expanded kish graphite at a temperature above 600° C.,
        iii. exfoliating the expanded kish graphite by ultra-sonication to obtain exfoliated kish graphite,
        iv. separating unexfoliated kish graphite from the exfoliated kish graphite to obtain pristine graphene.

2. The method as recited in claim 1 wherein in step C.i, the nitrate salt is chosen from the group consisting of: $NaNO_3$, $NH_4NO_3$, $KNO_3$, $Ni(NO_3)_2$, $Cu(NO_3)_2$, $Zn(NO_3)_2$, $Al(NO_3)_3$ and a mixture thereof.

3. The method as recited in claim 1 wherein in step, C.i the acid is chosen from the group consisting of: $H_2SO_4$, HCl, $HNO_3$, $H_3PO_4$, $C_2H_2Cl_2O_2$ (dichloroacetic acid), $HSO_2OH$ (alkylsulfonic acid) and a mixture thereof.

4. The method as recited in claim 1 wherein in step C.ii), the temperature is above 900° C.

5. The method as recited in claim 4 wherein in step C.ii), the temperature is between 900 and 1500° C.

6. The method as recited in claim 5 wherein in step C.ii), the temperature is between 900 and 1200° C.

7. The method as recited in claim 1 wherein in step C.ii), the expansion is performed during 1 min to 2 hours.

8. The method as recited in claim 1 wherein in step C.iii), before the mechanical exfoliation, the expanded kish graphite obtained in step Cii) is mixed with vitamin B2.

9. The method as recited in claim 8 wherein in step C.iii), the mixture of the expanded kish graphite and vitamin B2 is dispersed into water.

10. The method as recited in claim 1 wherein in step C.iii), the ultra-sonication is performed during a time above 1 hour.

11. The method as recited in claim 10 wherein in step C.iii), the time is between 1 h 30 min and 5 hours.

12. The method as recited in claim 1 wherein in step C.iii), during the ultra-sonication, the mixture is cooled down.

13. The method as recited in claim 12 wherein in step C.iii), the mixture is cooled down using an ice-bath.

14. The method as recited in claim 1 wherein in step C.iv), the separation is performed by centrifugation, decantation distillation or flotation.

15. The method of claim 1, wherein the pristine graphene comprises one single layer of carbon atoms bonded together in a honeycomb lattice having less than 5% of oxygens groups, less than 5% of nitrogen groups and less than 0.5% of hydrogen atoms.

16. The method of claim 1, wherein:
- in step C.i), the nitrate salt is chosen from the group consisting of: $NaNO_3$, $NH_4NO_3$, $KNO_3$, $Ni(NO_3)_2$, $Cu(NO_3)_2$, $Zn(NO_3)_2$, $Al(NO_3)_3$ and a mixture thereof, and the acid is chosen from the group consisting of: $H_2SO_4$, HCl, $HNO_3$, $H3PO_4$, $C_2H_2Cl_2O_2$ (dichloroacetic acid), $HSO_2OH$ (alkylsulfonic acid) and a mixture thereof;
- in step C.ii), the expansion is performed for 1 min to 2 hours; and
- in step C.iii), the ultra-sonication is performed for at least 1 hour.

* * * * *